J. C. FITZGERALD.
ELEVATED CARRIER.
APPLICATION FILED FEB. 24, 1910.

985,577.

Patented Feb. 28, 1911.

3 SHEETS—SHEET 1.

Witnesses:
Chas. E. Gorton
J. E. Hansen

Inventor:
Jeremiah C. Fitzgerald,
By Chas. E. Tillman, Atty.

THE NORRIS PETERS CO., WASHINGTON, D. C.

J. C. FITZGERALD.
ELEVATED CARRIER.
APPLICATION FILED FEB. 24, 1910.
985,577.
Patented Feb. 28, 1911.
3 SHEETS—SHEET 2.
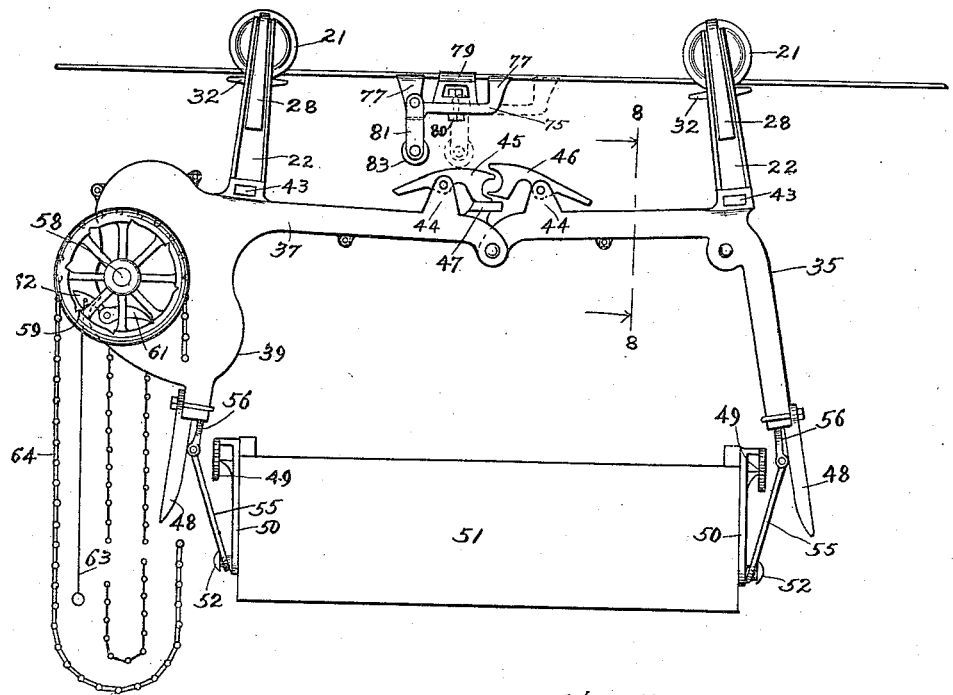
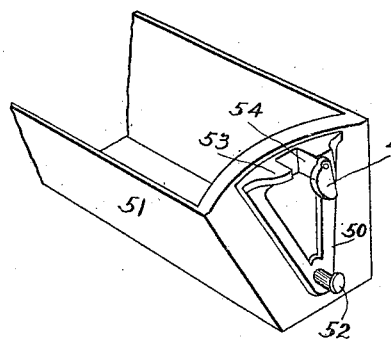
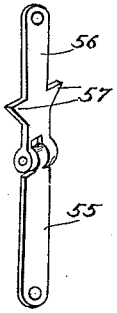
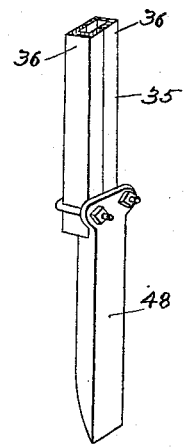
Witnesses:
Chas. E. Gorton
J. E. Hansen
Inventor:
Jeremiah C. Fitzgerald
By Chas. C. Gilman Atty.
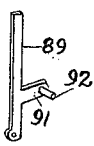

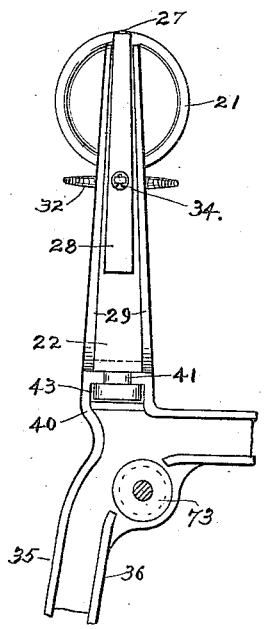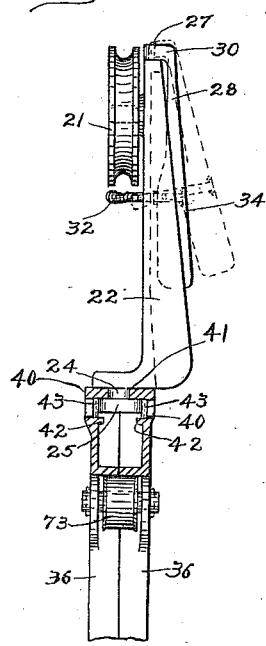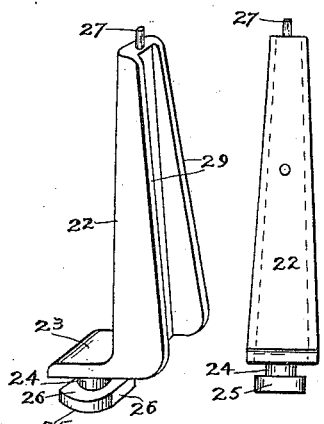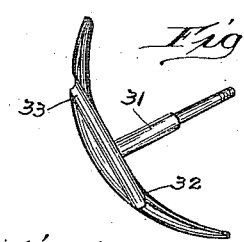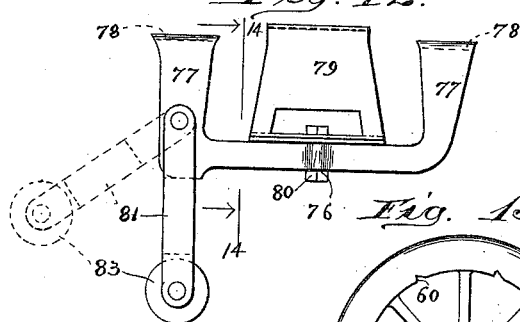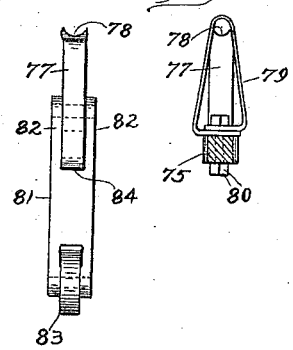

UNITED STATES PATENT OFFICE.

JEREMIAH C. FITZGERALD, OF DE KALB, ILLINOIS, ASSIGNOR TO SMITH MANUFACTURING COMPANY, OF CHICAGO, ILLINOIS, A CORPORATION OF ILLINOIS.

ELEVATED CARRIER.

985,577.  Specification of Letters Patent.  Patented Feb. 28, 1911.

Application filed February 24, 1910. Serial No. 545,558.

*To all whom it may concern:*

Be it known that I, JEREMIAH C. FITZGERALD, a citizen of the United States, residing at De Kalb, in the county of Dekalb and State of Illinois, have invented certain new and useful Improvements in Elevated Carriers, of which the following is a specification.

This invention relates to improvements in conveying or carrying apparatus and particularly to those adapted for use in connection with stables or barns for carrying the litter therefrom and dumping the same at suitable distant points outside of the stable or barn, and it consists in certain peculiarities of the construction, novel arrangement and operation of the various parts thereof, as will be hereinafter more fully set forth and specifically claimed.

The principal object of the invention is to improve the construction of carriers of the character above indicated and to embody therein simple and efficient means for quickly lowering the box or receptacle of the carrier to permit it to be loaded and then for easily raising the box or receptacle without the loss of time and to such an elevation as to be out of the way in its travel of obstructions such as water-tanks, pig-pens, fences, and the like.

Another object of the invention is to provide self-acting means for releasing the box or receptacle of the carrier at a predetermined point so that it will automatically dump its load.

Still another object, is to provide safety means for holding the wheels of the carrier on the track, which shall be of such construction as to offer no interference with the trip as the carrier passes the same.

Other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1:
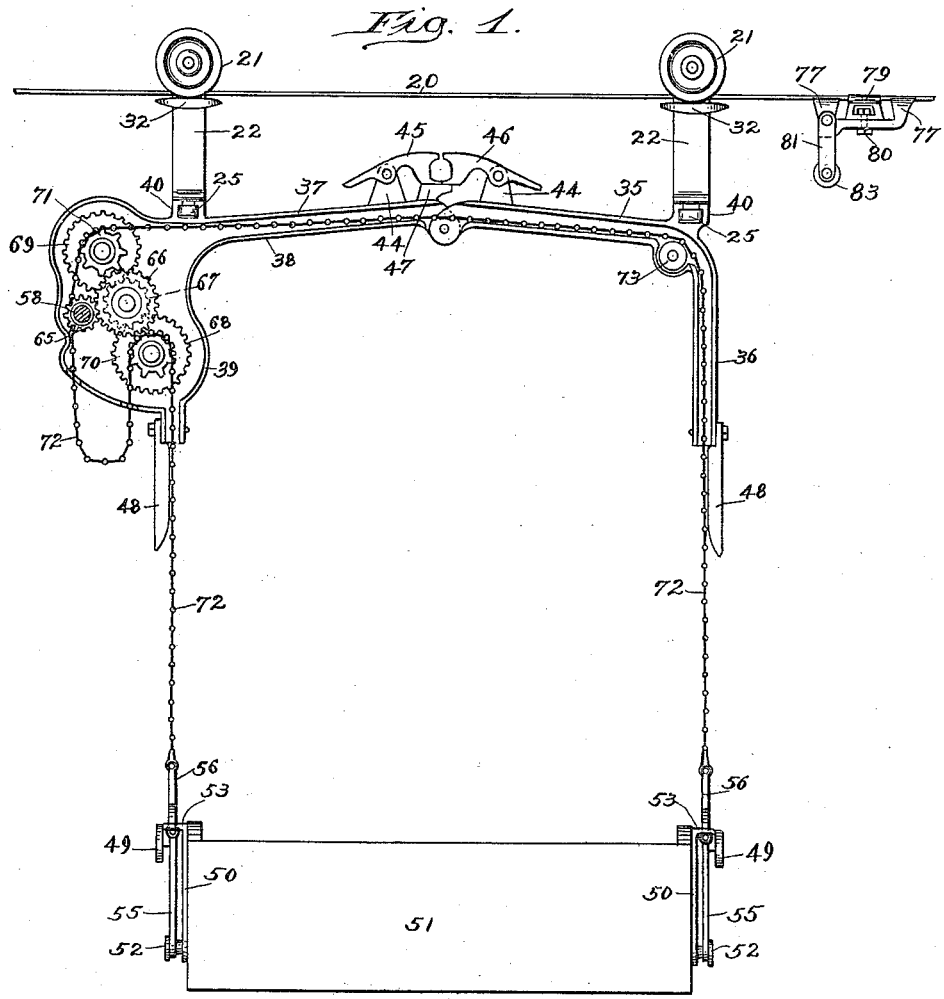
Figure 2:
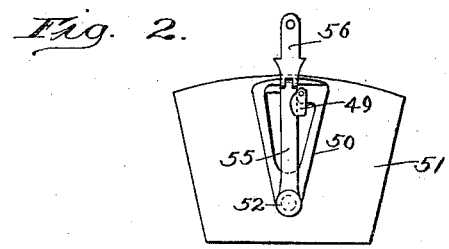

Figure 1, is a view in side elevation of a carrier embodying the invention showing it mounted on a portion of an elevated track equipped with a tripping device and illustrating the box of the carrier in its lowered position, and also showing one side of the bail-casing and the operating wheel for raising and lowering the box, removed; Fig. 2, is an end view in elevation of the box of the carrier showing the means for holding it in its upright position, yet so that it can be released for dumping; Fig. 3, is a view in side elevation of like parts, shown in Fig. 1, showing the box in its elevated position and the locking mechanism therefor released, to permit the box to automatically dump its load; Fig. 4, is a fragmental perspective view of a portion of the box showing one of the end brackets therefor secured in place; Fig. 5, is a detached perspective view of one of the locking members or hinges for the ends of the box; Fig. 6, is a similar view of a portion of the bail and one of the extensions thereon, used for releasing the locking members for the box; Fig. 7, is a side view of a portion of the bail with one of the wheel-carrying uprights or hangers mounted thereon, and showing the safety guard for holding the wheel on the track; Fig. 8, is an enlarged cross-sectional view taken on line 8—8 of Fig. 3, looking in the direction indicated by the arrows; Fig. 9, is a detached perspective view of one of the uprights or hangers for the wheels of the carrier; Fig. 10, is a side view thereof; Fig. 11, is a detached perspective view of one of the safety guards for holding the carrier on the track; Fig. 12, is an enlarged view in side elevation of a portion of the trip used for releasing the locking dogs carried by the bail members; Fig. 13, is an end view thereof; Fig. 14, is a cross-sectional view of the trip; Fig. 15, is a view in side elevation of the operating wheel for raising and lowering the box, showing the pawl and brake therefor; Fig. 16, is a side view of a portion of the bail, and one of the bail extensions thereon showing a modification in the means for releasing said extension from the engaging means on the receptacle; and Fig. 17, is a perspective view of a portion of one of the operating rods for actuating one of the bail extensions.

Like numerals of reference, refer to corresponding parts throughout the different views of the drawings.

The reference numeral 20, designates a portion of an elevated track which may be a flexible rod, cable or other kind of track, and supported in any suitable manner for the travel of grooved wheels 21, of the carrier, each of which is journaled on the upper portion of an upright or hanger 22, having at its lower end an off-set or horizontally disposed base 23, which is provided on its lower surface with a depending pintle 24, having a head 25, as is clearly shown in Figs. 8, 9, and 10, of the drawings. Each of the uprights or hangers 22, is provided at its upper end with a pin 27, to loosely engage the upper end of a depending arm 28, which is normally located between parallel flanges 29, with which each of the uprights 22, is provided on one of its surfaces. The arm 28, is provided at its upper end with a lateral extension 30, having an opening therein of sufficient size to receive the pin 27, on the upright, and to permit of some play of said arm. Extended horizontally through suitable openings in each of the uprights 22, and in each of the arms 28, is a stem 31, of a bow-shaped or segmental guard 32, which is located just below the wheel 21, and is provided on its upper surface with a groove 33, for the reception of the lower portion of the track 20, the upper portion of which will fit in the groove of the wheels 21, of the carrier. The stems 31, of the guards 32, are secured to the arms 28, by means of keys 34, so as to move therewith, but are loosely located in the openings in the uprights therefor.

Mounted on the lower end of one of the uprights 22, or hangers is a bail member which is designated as a whole by the reference numeral 35, and consists of two hollow or channeled pieces 36, counterparts of one another, but secured together to form substantially an angular-shaped figure in outlines. Mounted on the lower portion of the other upright or hanger 22, is another bail member, which is designated as a whole by the numeral 37, and consists of two hollow or channeled pieces 38, counterparts of one another, each of which is provided with a depending casing portion 39, also counterparts of one another. The pieces 38, of the bail member 37, as well as the casing portions 39, thereof, are secured together, and also form substantially an angular-shaped figure in outlines. Each of the bail members 35, and 37, is provided on its upper portion with an upward hollow extension 40, each having in its upper end an opening 41, for the reception of the pintle 24, on the base 23, of the upright or hanger. Each of the extensions 40, is provided on its inner surface with inwardly and oppositely disposed ledges 42, located just below the head 25, on the pintel 24, for the support of flat springs 43, one of which is located on each side of the flattened portion 26, of the head 25, and against the side walls of the extensions 40, so that they will act on the head 25, to normally hold its flattened side edges in alinement with the sides of the extension 40, as well as with the sides of the members 35, and 37, of the bail, yet in such a manner as to permit of a somewhat swiveled movement of the uprights in the bail members, which are located in alinement with one another under and in parallelism with the track 20, and have their adjacent ends pivotally connected together. Each of the members 35, and 37, of the bail, is provided near its inner end with an upright extension 44, on which are pivotally mounted a pair of locking dogs 45, and 46, the lower portion of the inner ends of which are adapted to rest on an upright lug 47, with which one of the members 35, or 37, is provided on its upper surface and to contact one with the other, as is clearly shown in Fig. 1, of the drawings, thus holding the bail members 35, and 37, in their raised and locked positions. The lower portion of each of the members 35, and 37, is equipped with a downward extension 48, which preferably has its lower end beveled and is used for displacing catches 49, one of which is pivotally mounted on the bracket 50, secured to each end of the box or receptacle 51 of the carrier.

As is clearly shown in Figs. 2, 3, and 4, of the drawings each of the brackets 50, is provided at its lower portion with a headed-bolt 52, and at its upper portion with an outwardly extended flange 53, having a recess 54, therein, to one side of which recess the catch 49, is pivotally secured to the said flange. Loosely mounted on each of the bolts 52, is the lower member 55, of a locking hinge which may have hinged to its upper portion another member 56, which is provided with laterally disposed projections 57, to act as stops and prevent the locking hinges being drawn into the hollow or channeled members of the bail.

Mounted on a suitable shaft 58, transversely journaled in the casing portion 39, of the bail member 37, is an operating wheel 59, which has on its inner periphery a series of recesses 60, to engage a gravity pawl 61, which is pivotally secured to the outer surface of the casing 39, and has extended therefrom, a brake-shoe 62, to which a cord 63, or chain may be attached and which shoe may be drawn into contact with the inner periphery of the wheel 59, so as to retard its movement while the pawl 61, will prevent its rotation in but one direction. The wheel 59, is preferably provided with a peripheral groove for the reception of a chain 64, located in said groove and hanging downwardly from the wheel for the purpose of being in easy reach and for operating the same. Mounted on the shaft 58, within the casing 39, is a pinion 65, which meshes with a pinion 66, journaled in the casing, on the shaft of which latter pinion is another pinion or spur-gear 67, which in turn meshes with two other spur-gears 68, and 69, journaled in the casing and on the shafts of which are mounted sprocket wheels 70, and 71, respectively. Located in the channels of the bail members 35, and 37, is a sprocket chain 72, which is extended over pulleys 73, journaled in said members, and has its ends connected to the upper members 56, of the locking hinges for the box.

As is clearly shown in Fig. 1, of the drawings, the chain 72, is engaged by the sprocket wheels 70, and 71, so that when the operating wheel 59, is turned in the proper direction, said sprocket wheels through the medium of the gearing which connects them with the shaft 58, of the operating wheel, will be turned in the proper direction to raise or lower the box of the carrier. When the box is raised from the position shown in Fig. 1, to that illustrated in Fig. 3, it will be understood that the extensions 48, on the lower portion of the bail members 35, and 37, will turn the pivoted catches 49, to one side of the recesses 54, in the brackets 50, on the ends of the box, and that the said extensions will be disposed on the outer surface of the locking hinges and will hold them in locked relation with said brackets until one of the locking dogs is depressed at its outer end by means of a trip mounted at a suitable point on the track, in which operation it is evident that the lower inner portions of the dogs 45, and 46, will be disengaged and that the pivotally connected or adjacent ends of the bail members 35, and 37, will be depressed to about the positions shown in Fig. 3, in which operation the extensions 48, will be moved outwardly from the brackets 50, and cause the locking hinges to be removed from the recesses 54, in the end brackets, thereby allowing the box 51, to turn on its pivots 52, and dump its load.

While any suitable tripping device may be employed, for releasing the locking dogs 45, and 46, yet a trip of the construction shown in Figs. 1, 3, 12, to 14, inclusive, is by preference employed, and said trip consists of a bar 75, provided with a vertical opening 76, and having on each side of said opening an upright extension 77, each of which is provided with a groove 78, in its upper surface to receive the lower surface of the track. Looped over the track 20, is a sheet metal clip 79, which has its lower ends overlapping one another and provided with an opening to receive a bolt 80, which is extended through said openings and the opening 76, in the bar, and used for securing the overlapped portions of the trip to the upper surface of the bar. Pivotally connected to one of the upright portions 77, of the trip, is an arm 81, which is preferably provided at its upper end with prongs 82, to stride the upright 77, and has journaled in its lower portion a roller 83, to contact with the locking dogs of the carrier. By reference to Figs. 12, and 13, it will be observed that the arm 81, will have a restricted pivotal movement, that is to say, it cannot be moved in one direction beyond a vertical line on account of the bottom of the recess 84, between the prongs 82, contacting with the lower portion of the bar 75, yet will be free to move in the other direction. Thus it will be seen that when the carrier is loaded and travels outwardly toward the dumping point, the roller 83, on the arm 81, of the trip, will be in position to actuate the dogs of the carrier, but after the carrier has dumped its load, and is on its return trip, the wheel and arm of the tripping device will be thrown upwardly so as not to obstruct the return of the car. As the safety guards 32, are loosely mounted in the uprights 22, and are carried by the loosely held arms 28, it is apparent that as the carrier passes the tripping device, one of the curved ends of the guards will strike one of the uprights 77, of said device and thus force the guards to about the positions shown by dotted lines in Fig. 8, of the drawings, which will permit them to pass the tripping device without hindrance, but as soon as the pressure is removed from the guards, they will by reason of the gravity of the arms 28, be moved back to their normal positions directly under the cable or track, thus preventing the wheels jumping off the same, or becoming displaced. By loosely connecting the hangers 22, to the extensions 40, on the bail members 35, and 37, and employing the springs 43, to co-act with the heads 25, on the pintles 24, of the hangers, it is manifest that a slightly swiveled movement will be afforded each of the hangers, thus permitting the carrier to turn curves and so that when it passes onto the straight track, the hangers and wheels will be brought into perfect alinement.

From the above description of my improvements, it will be understood that the improved carrier constructed according to my invention, is of an extremely simple and inexpensive nature, and it will also be evident from the above description, that the device is susceptible of considerable modification without material departure from the principles and spirit of the invention, and for this reason I do not desire to be understood as limiting myself to the precise form and arrangement of the several parts of the device as herein set forth in carrying out my invention in practice.

In Fig. 16, is shown a modification in the means for operating the bail extensions which engage the ends of the receptacle 51, which consists of a bail member 35ª, which may be hollow and has extended into its upper portion a trigger 85, which is pivoted on the bail member and is adapted to contact with a suitable tripping device on the track as the carrier travels back and forth thereon. Fulcrumed on the member 35ᵃ, at the upper portion of the downturned part at each end of said member is a bell-crank-lever to one arm 86, of which is secured a rod 87, which is engaged by the trigger 85, so as to be moved longitudinally in either direction. Pivotally connected to the other arm 88, of said bell-crank-lever, is a rod 89, which extends downwardly and is pivotally connected by means of a link 90, to the lower portion of the bail member. The rod or bar 89, has near its lower portion an arm 91, which is provided with a pin 92, to engage the support 93, of the upper member 56, of the bail extension, the other member 55, of which is secured on the pivot 52, of the receptacle as in the other construction. When this modified construction is employed, it will be understood that the support 93, for the bail extensions may be supported in any suitable manner above the pin 92, and that when the trigger is moved in either direction, the hinged or jointed members 56, and 55, forming the bail extensions will be thrown out of engagement with the engaging means on the ends of the receptacle, thus permitting the same to turn on its pivots and empty its contents.

Having thus fully described my invention what I claim as new and desire to secure by Letters-Patent is—

1. In an elevated carrier, the combination with a bail having on its upper portion centrally divided projections having cavities therein, of a receptacle supported thereby, upwardly extended hangers mounted at their lower ends for rotation within the cavities of said projections, a wheel journaled on each of said hangers, and a pair of springs located in the cavity of each projection to actuate said hangers.

2. In an elevated carrier, the combination with a bail having hollow and apertured extensions on its upper portion, a receptacle supported by the bail, upwardly extended hangers having their lower portions mounted for rotation in said extensions, a spring located in the cavity of each extension to actuate the hangers, and a wheel journaled on the upper portion of each hanger.

3. In an elevated carrier, the combination with a bail having hollow and apertured extensions on its upper portion, a receptacle supported by the bail, upwardly extended hangers each having on its lower end a pintle provided with a head located in the apertures and cavities respectively of said extensions, a spring in each of said extensions and applied to said heads to actuate the hangers, and a wheel journaled on each of the hangers.

4. The combination with an elevated track, of an upwardly extended hanger, a wheel journaled thereon, and a guard pivotally mounted on the hanger above the journal of said wheel and extended below the track.

5. The combination with an elevated track, of an upwardly extended hanger, a depending arm pivotally connected to the upper portion of the hanger, a wheel journaled on the hanger above the track, and a guard having a stem extended through the hanger below the track and secured to said arm.

6. The combination with an elevated track, of an upwardly extended hanger, a depending arm movably connected to the upper portion of the hanger, a horizontally disposed guard having curved end portions and provided with a stem extended through the hanger below the track and secured to said arm, and a wheel journaled on the hanger above the track.

7. In an elevated carrier, the combination with an elevated track, of a bail or frame, a receptacle supported thereby, an upwardly extended hanger mounted on the bail or frame, a wheel journaled on the hanger above the track, a guard loosely mounted on the hanger below the track, and means to normally hold the guard directly beneath the track but to permit of its lateral movement.

8. In an elevated carrier, the combination with an elevated track, of a bail or frame, a receptacle supported thereby, upwardly extended hangers mounted for rotation on the bail or frame, a wheel journaled on each of the hangers above the track, and a guard pivotally mounted on each hanger above the journal of its wheel and extended underneath the track and having a weight to normally hold it directly beneath the track but to permit of limited lateral movement.

9. In an elevated carrier, the combination with an elevated track, of a bail or frame, a receptacle supported thereby, upwardly extended hangers mounted for rotation on the bail or frame, a wheel journaled on each hanger above the track, a depending arm movably connected to each of the hangers, and a guard having a stem extended through each of the hangers below the track and secured to said arms.

10. In an elevated carrier, the combination with a wheeled bail or frame having bail extensions, of a receptacle supported on said extensions for vertical as well as pivotal movement, means for locking the ends of the receptacle, and means for spreading the bail extensions.

11. In an elevated carrier, the combination with an elevated track, of a wheeled bail or frame mounted thereon, a receptacle pivotally connected at each end near its bottom to the bail, a recessed projection at each end of the receptacle and near its top, means to engage the bail with said recessed projections, and means to automatically disengage the same.

12. In an elevated carrier, the combination with an elevated track, of a trip mounted thereon at a suitable point, a wheeled bail or frame mounted on the track and having bail extensions, a receptacle supported for vertical as well as pivotal movement on the bail extensions, means for raising and lowering the receptacle, means for locking its ends, and means to contact with the trip and for spreading the bail extensions and unlocking said ends when the receptacle has been raised and has reached a predetermined point on the track.

13. In an elevated carrier, the combination with an elevated track, of a trip mounted thereon at a suitable point, a wheeled bail or frame consisting of two alined members pivotally connected together at their adjacent ends and mounted on the track, interlocking dogs pivoted on the upper portion of said members to hold the same in their raised positions and adapted to contact with the trip for releasing the same, a receptacle supported for vertical as well as pivotal movement on the bail, means for raising and lowering the receptacle, means for locking its ends, and means for unlocking said ends when the receptacle is raised and one of said dogs has been depressed by the trip.

14. In an elevated carrier, the combination with an elevated track, of a trip mounted thereon at a suitable point, a wheeled bail or frame consisting of two alined members pivotally connected together at their adjacent ends and mounted on the track, interlocking dogs pivoted on the upper portion of said members to hold the same in their raised positions and adapted to contact with the trip for releasing the same, of a receptacle having at each of its ends an engaging device, a connection carried by the bail and having its ends pivotally connected to the ends of the receptacle and adapted to engage said engaging devices, means on the bail to operate said connection for the purpose of raising and lowering the receptacle, means on the lower portion of the bail to release the connection from said engaging devices when the receptacle is in its raised position and one of the interlocking dogs has been depressed by the trip.

15. In an elevated carrier, the combination with an elevated track, of a depending trip mounted thereon, a wheeled bail or frame consisting of two alined members pivotally connected together at their adjacent ends and mounted on the track, interlocking dogs pivoted on the upper portion of said members to hold the same in their raised positions and adapted to contact with the trip for releasing the same, a flexible support movably carried by the bail and having its ends extended through the lower ends thereof, a receptacle pivotally secured to the ends of the support, a bracket secured on each end of said receptacle and having a recess in its upper portion to engage parts of the support, a catch pivoted on each of the brackets to normally engage said portions of the support, means on the bail for raising and lowering the receptacle, and extensions on the lower portion of the bail to displace the said catches when the receptacle is raised and to release the parts of the support from said recesses when one of the locking dogs has been depressed by the trip.

16. In an elevated carrier, the combination with an elevated track, of a depending trip mounted thereon, a wheeled bail or frame consisting of two alined members pivotally connected together at their adjacent ends and mounted on the track, interlocking dogs pivoted on said members to hold the same in their raised positions and adapted to contact with the trip, a connection movably carried by the bail, a locking hinge on each end of said connection, a receptacle pivotally connected to the lower portion of the lower member of each hinge, a bracket secured on each end of said receptacle and having a recess in its upper portion to engage the lower members of said hinges, a catch pivoted on each of the brackets to normally engage said lower members of the hinges, means on the bail engaging the connection for raising and lowering the receptacle, and extensions on the lower portion of the bail to displace the said catches when the receptacle is raised and to release the lower members of the locking hinges from said recesses when one of the locking dogs has been depressed by the trip.

17. In an elevated carrier, the combination with an elevated track, of a depending trip mounted thereon at a suitable point, a wheeled bail or frame consisting of two alined members pivotally connected together at their adjacent ends, a receptacle supported by the bail or frame, and interlocking dogs pivotally mounted on the bail members near their adjacent ends for holding said ends in their raised position until the locking dogs are disengaged by the trip.

18. In an elevated carrier, the combination with a suitably supported receptacle, of a bracket secured on each of its ends and having a recess in its upper portion, a jointed bail extension loosely secured at its lower end to each of said brackets, and means to hold said extensions in engagement with the brackets.

19. In an elevated carrier, the combination with a suitably supported receptacle, of a bracket secured on each of its ends and having a recess in its upper portion, a jointed bail extension pivotally secured at its lower end to each of said brackets, means to hold said extensions in engagement with the recesses of said brackets, and means to spread the extensions from said recesses.

20. In an elevated carrier, the combination with the bail or frame thereof, of an operating-wheel journaled thereon and having recesses in its inner periphery, a pawl and brake-shoe pivotally supported near the wheel to move in unison and adapted to alternately engage the inner periphery of the wheel.

21. In an elevated carrier, the combination with the bail or frame thereof, of an operating-wheel journaled thereon and having recesses in its inner periphery, a pawl and brake-shoe pivotally supported near the wheel to move in unison, the pawl being heavier than the brake-shoe, and means to cause the brake-shoe to contact with the wheel.

22. A tripping device for elevated carriers, consisting of a bar having on its upper surface a pair of spaced apart extensions to rest against the lower portion of the track, a clip looped over the track and having its lower portion secured to the upper surface of the bar between said extensions thereon, a depending arm pivoted to one of said extensions, and a roller journaled on the lower end of said arm.

23. A tripping device for elevated carriers, consisting of a bar having on its upper surface a pair of spaced apart extensions to rest against the lower portion of the track, a clip looped over the track and having its lower portion secured to the upper surface of the bar between the said extensions thereon, a depending arm pivoted for restricted movement on the body of the tripping device, and a roller journaled on the lower end of said arm.

24. In an elevated carrier, the combination with a suitably supported receptacle having engaging means at each of its ends, of jointed bail extensions pivotally secured to the ends of the receptacle and adapted to engage said engaging means thereon, and means for spreading the bail extensions to disengage the same from said engaging means when it is desired that the receptacle shall dump its contents.

25. In an elevated carrier, the combination with a suitably supported receptacle having engaging means at each of its ends, of extensible jointed bail extensions pivotally secured to the ends of the receptacle and adapted to engage said engaging means thereon, and means for spreading the bail extensions to disengage the same from said engaging means when it is desired that the receptacle shall dump its contents.

JEREMIAH C. FITZGERALD.

Witnesses:
J. E. HANSEN,
CHAS. C. TILLMAN.

---

Copies of this patent may be obtained for five cents each, by addressing the "Commissioner of Patents, Washington, D. C."